Aug. 28, 1951  A. J. BRUNING  2,566,079
COLOR COMPARATOR
Filed May 2, 1949  5 Sheets-Sheet 1
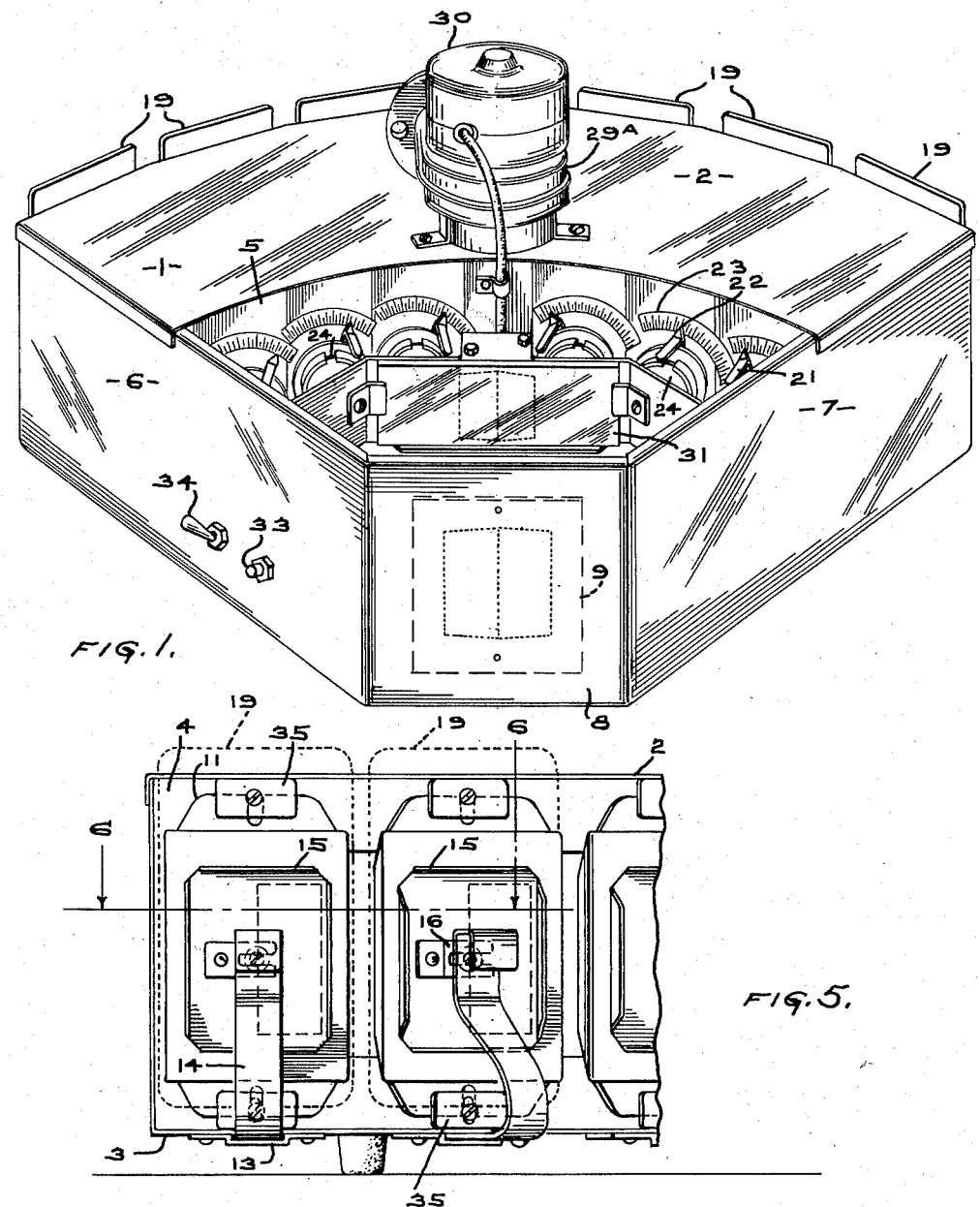
Inventor
Armin J. Bruning
By Thomas W. Y. Clark
Attorney

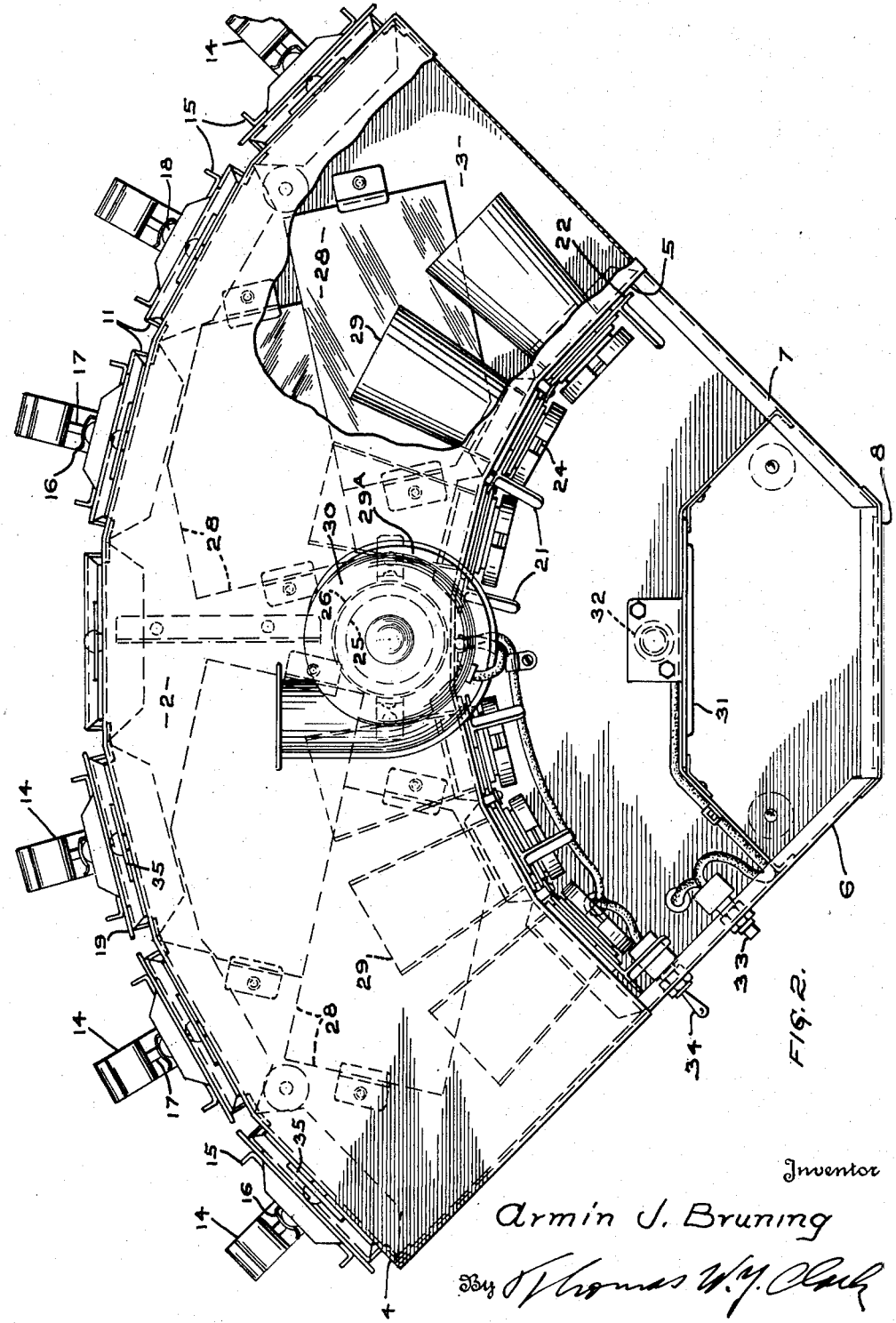

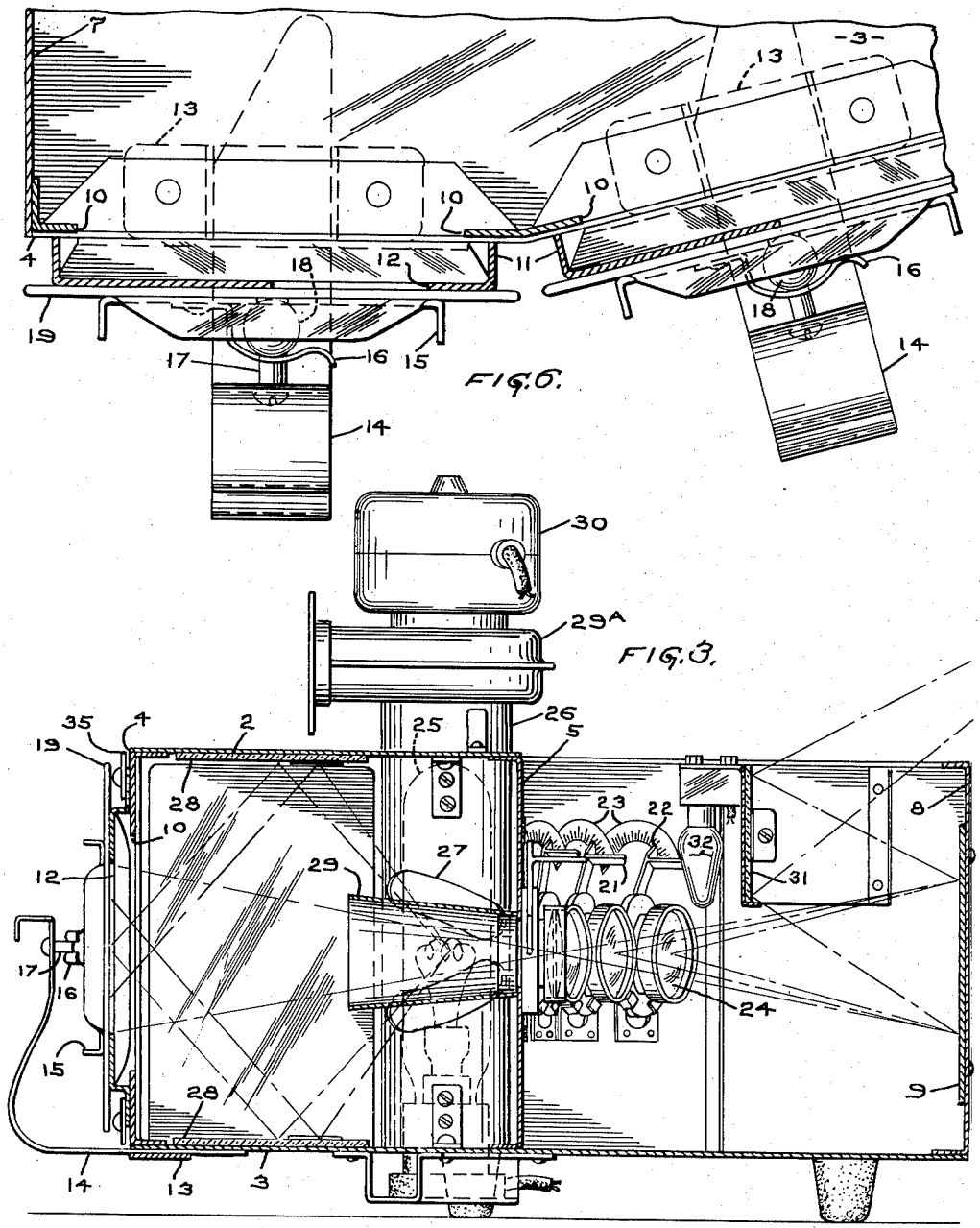

Aug. 28, 1951  A. J. BRUNING  2,566,079
COLOR COMPARATOR
Filed May 2, 1949  5 Sheets-Sheet 4
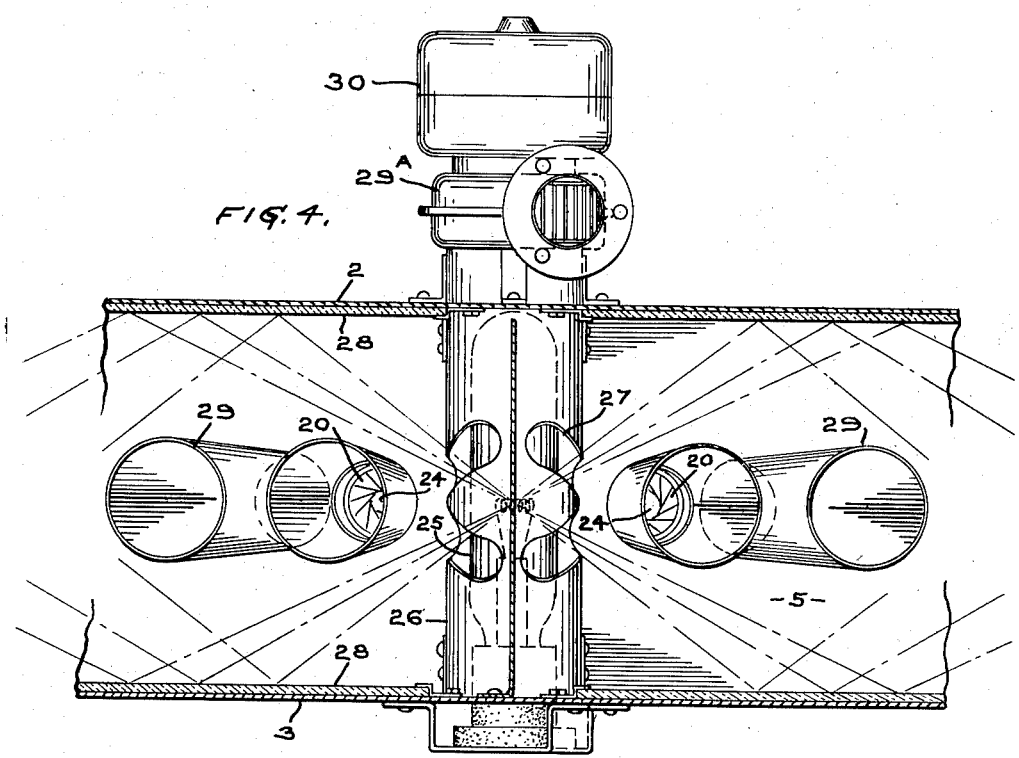
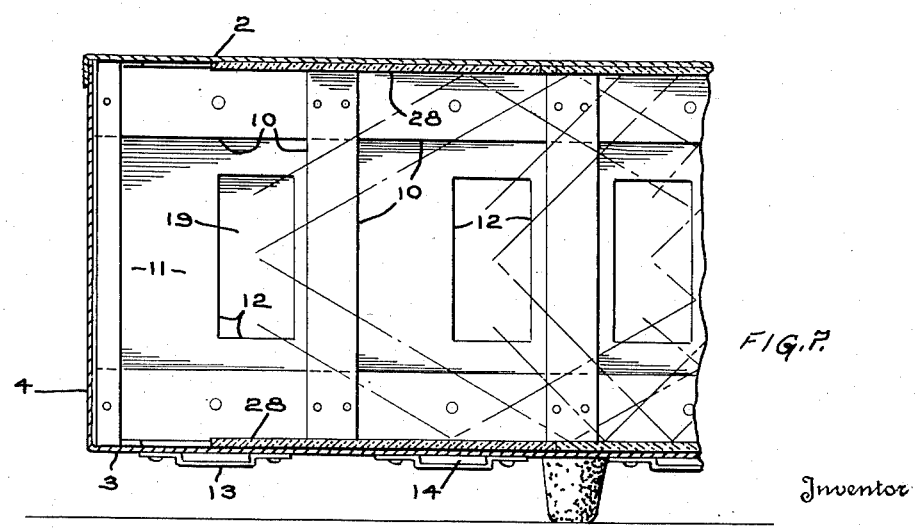
Inventor
Armin J. Bruning
By Thomas W. M. Clark
Attorney Aug. 28, 1951  A. J. BRUNING  2,566,079
COLOR COMPARATOR
Filed May 2, 1949  5 Sheets-Sheet 5

Inventor
Armin J. Bruning
By Thomas W. M. Clark
Attorney

Patented Aug. 28, 1951

2,566,079

UNITED STATES PATENT OFFICE 2,566,079

COLOR COMPARATOR

Armin J. Bruning, Baltimore, Md.

Application May 2, 1949, Serial No. 90,789

14 Claims. (Cl. 88—14)

This invention relates to color matching and apparatus therefor. In the standardization of paints and their colors and tints over a period of years means heretofore at hand for this purpose have not proved adequate. Although standards have been available which are quite permanent it has not heretofore been possible with the available apparatus to compare them accurately with the products that may be produced in any particular time and to find the deficiency in the present product to make it conform to the desired standard.

The present invention is directed to a color comparator which will receive several different standard color members and combine them and cast their image on a screen and the comparator will also receive the presently produced color or sample member and cast its image on a screen to one side of the standard image and then other colors or tints may be added to the sample and combined therewith until the two images are identical in color and intensity and these added colors will indicate what needs to be added to the sample color to produce the standard color.

The standard colors may be classified according to the color and their combinations and the amount of light required in reflecting their image on the screen and then these standard colors with all their different tints may be reproduced at any time thereafter by simply referring to the manner of their original composition which produced the desired effect.

The comparator comprises a housing with an image screen placed outside the housing and to one side of the housing, and with frames for receiving color members on the side of the housing furthest from the image screen, and with the side of the housing between the frames and screen forming a partition having openings therein, the openings preferably having therein lenses and iris diaphragms through which images of the color members on the frames are cast on the screen. The housing has therein a source of light which is shielded from the frames so that the direct rays from the light will not strike either the colors on the frames or be reflected to the image screen. Reflecting means are preferably placed in the housing to direct the light indirectly to the color members on the frames. The frames and lenses are preferably positioned in the housing in such a manner as to make at least two distinct images on the image screen although it will be apparent that a larger number of images could be cast if desired. A viewing or reflecting screen is placed between the partition and image screen to change the direction of inspection of the images for the convenience of the operator.

The above and other objects and advantages of the apparatus of the instant invention will be apparent from the following description and the accompanying drawings forming a part hereof, and in which:

Figure 1 is a front perspective view of the comparator.

Figure 2 is a top plan view thereof partly broken away.

Figure 3 is a vertical sectional view thereof.

Figure 4 is a fragmentary transverse vertical sectional view thereof.

Figure 5 is a fragmentary rear elevational view thereof.

Figure 6 is a cross-sectional view on line 6—6 of Figure 5.

Figure 7 is a fragmentary sectional view opposite Figure 4.

In the drawings similar numerals refer to similar parts throughout the several views.

Figure 9:
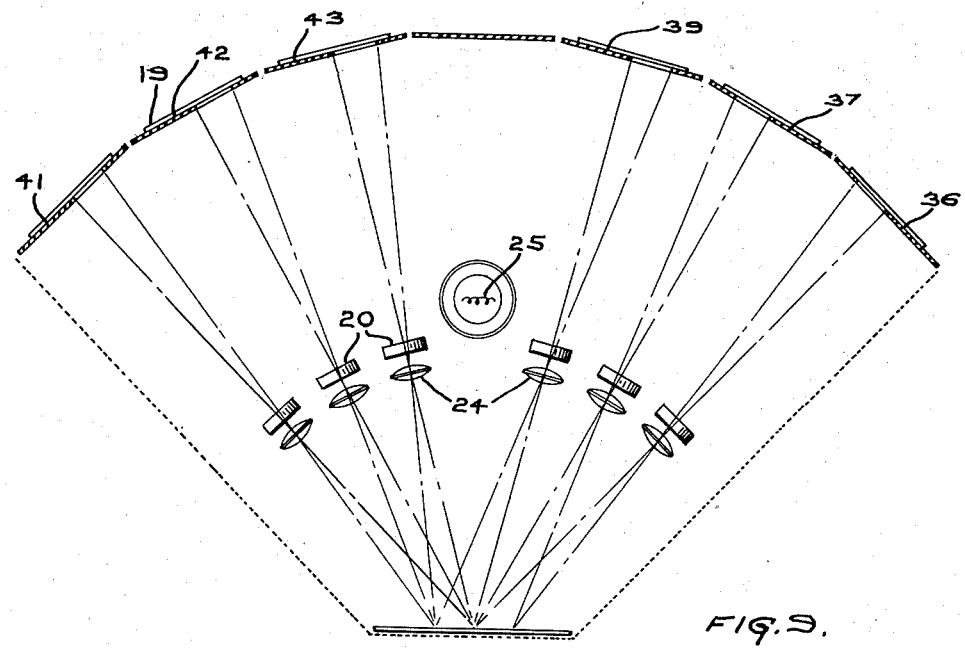
Figure 9 is a diagrammatic view showing the superimposition of several of the images over one another.

The housing 1 is of arcuate formation having a top wall 2 and a lower wall 3 and a rear wall 4 and a forward wall or partition 5. The ends of the housing 6 and 7 project forward and are joined by plate 8 on which image screen 9 is located. The screen center is at approximately the axis of the arc of the walls 4 and 5 of the housing.

The rear wall 4 of the housing has a plurality of openings 10 around the circumference thereof and these openings are all covered by matts 11 each matt having an opening 12 therein.

The lower wall 3 of the housing has a plurality of clips 13 thereon, in which are placed springs 14, each spring having a frame 15 detachably held thereon through means of bifurcated clamps 16 thereon between the prongs of which pass rods 17 having balls 18 thereon to hold the frames 15 on the springs 14 with a considerable latitude of relative motion being allowed between the spring and frame. Colors or color panels or members 19 are held by the frames against the matts 11 over the openings 12 therein. These color members may be changed by simply bending the spring outwardly to relieve the pressure of the frame upon the color member or if desired the whole frame may be removed by pulling the spring from its clip 13.

The wall or partition 5 has therein a plurality of apertures or openings which are shown as iris diaphragms 20 and the size of these diaphragms may be varied by handles 21 having pointers 22 thereon and graduated scales 23 are on the partition so that the opening of each diaphragm may be recorded. Lenses 24 are preferably also in these apertures in the partition 5.

A source of light or illumination is provided in the form of an electric bulb 25 and it is enclosed in a tube 26 forming a shade or shield for the light, and it has openings 27 therein. The housing has reflecting surfaces 28 on the inside of its upper and lower walls to reflect the light from the openings 27 indirectly to the color panels 19. The diaphragms 20 also have shades 29 therearound to prevent any direct rays or reflection of rays from passing through the diaphragms to the image screen 9. The shade 26 for the bulb 25 has at its top a fan 29A operated by a motor 30 to withdraw the heat generated by the light from the housing.

So that an operator may sit in front of the machine and conveniently manipulate the color members on its rear wall a reflecting screen 31 is placed between the partition 5 and image screen 9 and above the rays of reflection to the image screen as shown in Figure 3. From his position in the front of the machine the operator can clearly compare the matching of the images on the image screen. A small light 32, which may be turned on by a spring switch 33, is provided to accurately read the scales 23 for the iris diaphragms. The motor 30 and light 25 are actuated by switch 34.

Figure 8:
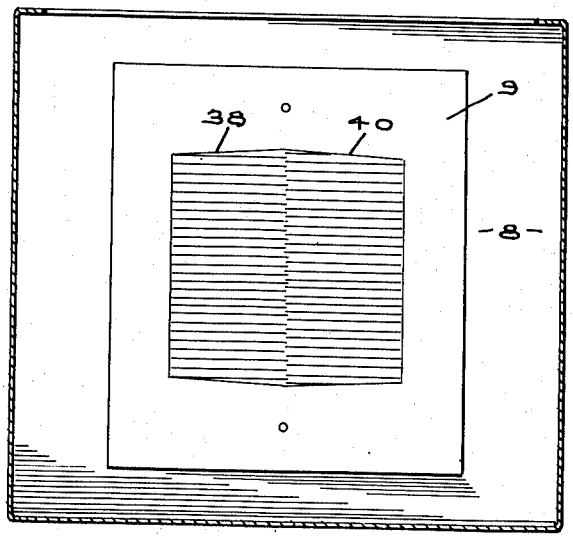
Figure 8 is an elevational view of the image screen.

In the form of the invention illustrated the matts 11 have their openings on one side, the matts may be reversed by means of releasable clips 35 to place the opening on the other side. The openings 10 in view of the positioning of the lenses in the partition 5 would project an image over substantially the whole of the image screen 9. The position of the openings 12 in the matts 11 allows for the projection of an image on one vertical half of the image screen as shown in Figure 8. If the position of the matts be reversed then the image from that particular color member or frame will be projected on the other side of the image screen 9.

As shown in Figure 9 the two right hand matts 36 and 37 are placed in one position and the color members placed thereon when superimposed fall on one side 38, see Figure 8, of the image screen and make the standard blue indicated. The sample color member which has been produced may be placed back of matt 39 which will cast its image on side 40 of the image screen. Since, however, this image as cast is not exactly the tint or color desired it may be modified by casting over it images through matts 41, 42 and 43 and with these additions the colors will match. It will be apparent from this illustration that the matts as diagrammatically illustrated in Figure 9 at 41, 42, 43 and 39 were in one position to cast the combined image of the color members on one side of the image screen and that next thereto the distinct image through the matts 37 and 36 combined is cast, these matts being reversed from the other four matts in order to cast the image to the side of and distinct from the image of the four combined color members. It will of course be apparent that with other openings in the matts other combinations of distinct images may be made.

The variation of the amount of the reflection through the diaphragms will of course determine the intensity of the color reflected and that intensity will very generally vary the shade of the color of either the standard or the sample or any of the components of either. The reading on the scale of the openings of the diaphragms therefore forms an important part of the color record to be kept with the standard color members in order to produce any given sample color at a later date. Likewise the positioning of the standard color members in the machine with respect to the light may be important if the machine as illustrated with only one light is used since there has been found to be in practice a difference between the various frames because of their distance from the light. The degree of light reflection from a color member further removed from the light is less than that reflected from a color member nearer the light. Each of these notations should be made in order to reproduce at a later time the exact color from the standard by means of the instant invention.

Where a very dark standard color is to be matched by breaking it down with multiple superimposed colors for matching the dark standard color, better matching results are obtained when the dark color is diluted by white. This brightens the dark color and makes it easier to match and the record is made accordingly including the use of white in combination with the dark color, and this viration or dilution of the dark color is considered when making the pigment mix.

Should it be desired to use actual articles whose color is to be compared in the openings in place of the color panels or members illustrated, that may be done within the scope of the invention, also additional lights could be placed in the housing or the distance of the color members from the lights could be varied in order to obtain a uniformity of illumination of the color members, within the scope of the invention, or the lens size or the openings of the diaphragms may be varied for the same purpose. Many other changes could likewise be made in the particular apparatus described without departing from the spirit of the invention as defined in the claims.

What is claimed as new and is desired to be secured by Letters Patent is:

1. A color comparator comprising a base, an image screen thereon, at least three color member supporting frames on the base substantially equidistantly spaced from and on one side of said screen, adapted to support thereon reflecting color members facing the screen, a source of light on the side of the frames toward the screen to illuminate color members on the frames to reflect images of color members on the frames toward the screen, a partition between said frames and screen having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames.

2. A color comparator comprising a base, an image screen thereon, at least three color member supporting frames on the base substantially equidistantly spaced from and on one side of said screen, adapted to support thereon reflecting color members, facing the screen, means to illuminate the color members on the frames on the side of the frames toward the screen with indirect rays of light, to reflect images of color members on the frames toward the screen, and means to prevent direct rays of light from reaching the color members and the image screen, a partition between said frames and screen having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames.

3. A color comparator comprising a base, an image screen thereon, at least three color member supporting frames on the base substantially equidistantly spaced from and on one side of said screen, adapted to support thereon reflecting color members facing the screen, a source of light on the side of the frames toward the screen to illuminate color members on the frames to reflect images of color members on the frames toward the screen, a partition between said frames and screen having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames and means in said openings to vary their size and consequently the proportion of color reflection passing therethrough.

4. A color comparator comprising a base, a housing thereon, an image screen on said base adjacent one side of the housing, at least three color member supporting frames in the housing beyond said side and opposite said screen spaced substantially equidistantly from said screen, adapted to support thereon reflecting color members facing the screen, a source of light on the side of the frames toward the screen in the housing to illuminate color members on the frames, to reflect images of color members on the frames toward the screen, the housing having image forming openings therein corresponding in number to the number of the frames, one opening being in line with each said frame and the screen, and two color members, when on separate frames, being in line with the same portion of the screen and another color member, when on another frame, being in line with another portion of the screen, through which openings reflected images of color members on the frames, one through each opening, are cast on the screen, forming at least two distinct images from color members on the frames.

5. A color comparator comprising a base, a housing thereon, an image screen on said base adjacent one side of the housing, at least three color member supporting frames in the housing beyond said side and opposite said screen spaced substantially equidistantly from said screen, adapted to support thereon reflecting color members facing the screen, a source of light on the side of the frames toward the screen in the housing to illuminate color members on the frames, to reflect images of color members on the frames toward the screen, the housing having image forming openings therein, corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct and adjacent images from color members on the frames, and means associated with one of said frames to cast the image of the color member thereon to combine with either of the said distinct images.

6. A color comparator comprising a base, an arcuate shaped housing thereon having substantially parallel inner and outer arcuate sides, an image screen on said base adjacent the axis of the arcs, at least three color member supporting frames in the outer arcuate side of the housing, adapted to support thereon reflecting color members facing the screen, a source of light in the housing to illuminate color members on the frames to reflect images of color members on the frames toward the screen, the inner arcuate side of the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames.

7. A color comparator comprising a base, a housing thereon, an image screen on said base adjacent one side of the housing, at least three color member supporting frames in the housing beyond said side and opposite said screen spaced substantially equidistantly from said screen, adapted to support thereon reflecting color members facing the screen, a source of light on the side of the frames toward the screen in the housing to illuminate color members on the frames, to reflect images of color members on the frames toward the screen, the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, means in said openings to vary their size and consequently, the proportion of color reflection passing therethrough.

8. A color comparator comprising a base, a housing thereon, an image screen on said base adjacent one side of the housing, at least three color member supporting frames in the housing beyond said side and opposite said screen spaced substantially equidistantly from said screen, adapted to support thereon reflecting color members facing the screen, a source of light on the side of the frames toward the screen in the housing to illuminate color members on the frames, to reflect images of color members on the frames toward the screen, the housing having openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, image forming lenses in said openings and means in said openings to vary their size and consequently, the proportion of color reflection passing therethrough.

9. A color comparator comprising a base, an image screen thereon, at least three color member supporting frames on the base substantially equidistantly spaced from and on one side of said screen, adapted to support thereon reflecting color members facing the screen, a source of light on the side of the frames toward the screen to illuminate color members on the frames to reflect images of color members on the frames toward the screen, a partition between said frames and screen having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, a reflecting screen between said partition and image screen positioned out of the path of reflection to the image screen to reflect the images on the image screen.

10. A color comparator comprising a base, a housing thereon, an image screen on said base adjacent one side of the housing, at least three color member supporting frames in the housing beyond said side and opposite said screen spaced substantially equidistant from said screen adapted to support thereon reflecting color members facing the screen, a source of light in the housing between the screen and frames to illuminate color members on the frames to reflect images of color members on the frames toward the screen, the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, a viewing screen between said housing and image screen positioned out of the path of reflection to the image screen to reflect the images on the image screen.

11. A color comparator comprising a base, a housing thereon, an image screen on said base adjacent one side of the housing, at least three color member supporting frames in the housing beyond said side and opposite said screen, spaced substantially equidistantly from said screen, adapted to support thereon reflecting color members facing the screen, a source of light in the housing between the screen and frames to illuminate color members on the frames to reflect images of color members on the frames toward the screen, the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, shields and reflecting means in said housing to diffuse the rays from said source of light and to prevent direct rays of light from reaching the color members and the image screen.

12. A color comparator comprising a base, an arcuate shaped housing thereon having substantially parallel inner and outer arcuate sides, an image screen on said base adjacent the axis of the arcs, at least three color member supporting frames in the outer arcuate side of the housing, adapted to support thereon reflecting color members facing the screen, a source of light in the housing between the screen and frames to illuminate color members on the frames to reflect images of color members on the frames toward the screen, the inner arcuate side of the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, shields and reflecting means in said housing to diffuse the rays from said source of light and to prevent direct rays of light from reaching the color members and the image screen.

13. A color comparator comprising a base, a housing thereon, an image screen on said base adjacent one side of the housing, at least three color member supporting frames in the housing beyond said side and opposite said screen spaced substantially equidistant from said screen, adapted to support thereon reflecting color members facing the screen, a source of light on the side of the frames toward the screen in the housing between the screen and frames to illuminate color members on the frames to reflect images of color members on the frames toward the screen, the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, shields in said housing to prevent direct rays of light from said source of light from reaching the color members and the image screen.

14. A color comparator comprising a base, a housing thereon, an image screen on said base adjacent one side of the housing, at least three color member supporting frames in the housing beyond said side and opposite said screen, spaced substantially equidistantly from said screen adapted to support thereon reflecting color members facing the screen, a source of light on the side of the frames toward the screen in the housing between the screen and frames to illuminate color members on the frames to reflect images of color members on the frames toward the screen, the housing having image forming openings therein corresponding in number to the number of the frames, one opening being in line with each said frame and the screen, and two color members, when on separate frames, being in line with the same portion of the screen and another color member, when on another frame, being in line with another portion of the screen through which openings reflected images of color members on the frames, one through each opening, are cast on the screen, forming at least two distinct images from color members on the frames, and means associated with one of said frames to change the location on the image screen of the image cast from the color member on said frame, from one of said portions of the image screen to the other.

ARMIN J. BRUNING.

REFERENCES CITED

The following references are of record in the file of this patent:

UNITED STATES PATENTS

| Number | Name | Date |
| --- | --- | --- |
| 973,962 | Oliver | Oct. 25, 1910 |
| 1,879,098 | Coffey | Sept. 27, 1932 |
| 1,880,026 | Singerman | Sept. 27, 1932 |
| 2,434,450 | Williford | Jan. 13, 1948 |

FOREIGN PATENTS

| Number | Country | Date |
| --- | --- | --- |
| 333,678 | Germany | Sept. 2, 1919 |